United States Patent [19]
Senior

[11] Patent Number: 6,118,890
[45] Date of Patent: *Sep. 12, 2000

[54] SYSTEM AND METHOD FOR BROAD CLASSIFICATION OF BIOMETRIC PATTERNS

[75] Inventor: Andrew William Senior, White Plains, N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/968,403

[22] Filed: Nov. 12, 1997

[51] Int. Cl.$^7$ ........................................ G06K 9/50
[52] U.S. Cl. ............................. 382/125; 382/228
[58] Field of Search ................ 382/115–127, 193, 382/201, 215, 224, 228, 227; 340/825.34; 356/71; 704/256

[56] References Cited

U.S. PATENT DOCUMENTS

| | | | |
|---|---|---|---|
| 4,151,512 | 4/1979 | Riganati et al. | 340/146.3 E |
| 4,310,827 | 1/1982 | Asai | 340/146.3 E |
| 4,607,384 | 8/1986 | Brooks | 382/124 |
| 4,817,183 | 3/1989 | Sparrow | 382/4 |
| 5,140,642 | 8/1992 | Hsu et al. | 382/5 |
| 5,226,091 | 7/1993 | Howell et al. | 382/3 |
| 5,239,594 | 8/1993 | Yoda | 382/158 |
| 5,337,369 | 8/1994 | Shibuya | 382/125 |
| 5,458,809 | 10/1995 | Kim et al. | 382/160 |
| 5,497,429 | 3/1996 | Shibuya | 382/125 |
| 5,745,600 | 4/1998 | Chen et al. | 382/218 |
| 5,787,198 | 7/1998 | Agazzi et al. | 382/196 |

OTHER PUBLICATIONS

Andrew Senior, A Hidden Markov Model Fingerprint Classifier, IEEE publication, 1998.

Krishna Nathan et al., Initialization of Hidden Markov Models for Unconstrained On–Line Handwriting Recognition, IEEE publication, 1996.

Andrew W. Senior et al., An Off–Line Cursive Handwriting Recognition System, IEEE publication, 1998.

Andrew Senior, Duration Modeling Results for an On–Line Handwriting Recognizer, IEEE publication, 1996.

Yang He et al., 2–D Shape Classification Using Hidden Markov Model, IEEE Transactions on Pattern Analysis and Machine Vision, vol. 13, No. 11, pp. 1172–1184, Nov. 1991.

O. Agazzi et al., "Connected and Degraded text recognition Using Planar Hidden Markov Models", IEEE, Apr. 1993, vol. V, pp. 113–116.

L.R. Rabiner, et al. "An Introduction to Hidden Markov Models", IEEE, Jan. 1986, pp. 4–16.

N. Ratha, et al., "A Real–Time Matchind System for Large Fingerprint Databases", IEEE, vol. 18, No. 8, Aug. 1996, pp. 799–813.

K. Karu, et al., "Fingerprint Classification", Pattern Recognition, vol. 29, No. 3, pp. 389–404, 1996.

A.P. Fitz et al., "Fingerprint Classification Using a Hexagonal Fast Fourier Transform", Pattern Recognition, vol. 29, No. 10, pp. 1587–1597, 1996.

G. T. Candela et al., "PCASYS—A Pattern–level Classification Automation System for Fingerprints", U.S. Department of Commerce, Aug. 1, 1995.

J.L. Blue et al., "Evaluation of Pattern Classifiers for Fingerprint and OCR Applications", Pattern Recognition, vol. 27, pp. 485–501, 1994.

M. Kawagoe et al., "Fingerprint Pattern Classification", Pattern Recognition, vol. 17, No. 3, pp. 295–303, 1984.

C.L. Wilson et al., "Neural Network Fingerprint Classification", J. Artificial Neural Networks, vol. 1, No. 2, 1993.

*Primary Examiner*—Leo H. Boudreau
*Assistant Examiner*—Brian P. Werner
*Attorney, Agent, or Firm*—Whitham, Curtis & Whitham; Louis J. Percello, Esq.

[57] ABSTRACT

A computer implemented method may be used in classifying and identifying finger prints. Dab prints are analyzed according to intersections with fiducial lines. A two-dimensional Hidden Markov Model is then used to correspond states of data based on the intersections.

7 Claims, 6 Drawing Sheets ies now designed to use dabs, where
SYSTEM AND METHOD FOR BROAD CLASSIFICATION OF BIOMETRIC PATTERNS

CROSS-REFERENCE TO RELATED APPLICATION

This application is related in subject matter to application Ser. No. 08/837,069 filed Apr. 11, 1997, by R. M. Bolle et al. for "System and Method for Determining Ridge Counts in Fingerprint Image Processing" and assigned to a common assignee herewith. The disclosure of application Ser. No. 08/837,069 is incorporated herein by reference.

DESCRIPTION

BACKGROUND OF THE INVENTION

1. Field of the Invention

This invention generally relates to the field of image processing and, more particularly, to a system and method for processing and classifying biometric images, especially fingerprint images.

2. Background Description

There exist systems for accomplishing automatic authentication or identification of a person using a biometric measurement, that is, a measurement of a behavioral or physical characteristic of that person. One such physical characteristic is a person's fingerprint. A fingerprint of a person comprises a distinctive and unique ridge pattern structure which allows for such identification of a single person among millions of others.

The fingerprints that are observed may be grouped into sets of similar-looking prints, which are termed classes. Fingerprint classification is the process of assigning a fingerprint to one of a number of these predetermined classes. Fingerprint classification has been practiced for many years as a method of indexing large databases of fingerprints. Such class-based indexing allows quicker location of a particular individual's prints. If a print is known to be of class X, then only those database fingerprints of class X need be examined to look for a match.

FIGS. 1A to 1E show five different fingerprints, each having distinctive characteristics. These fingerprints are classified in different classes of the Henry classification system based on their overall ridge patterns. FIGS. 1A and 1B show left and right loop patterns, respectively.

FIGS. 1C and 1D show tented arch and arch patterns, respectively. FIG. 1E shows a whorl pattern. The system of classification used by human experts at the Federal Bureau of Investigations (FBI) has been described in *The Science of Fingerprints (Classification and Uses)*, Superintendent of Documents, U.S. Government Printing office, Washington D.C. 20402: US Department of Justice, 1284 edition, (1984).

Recently, attempts have been made to automatically classify fingerprints using computers. This allows the more rapid indexing of fingerprint databases and can improve the speed and accuracy of Automatic Fingerprint Identification Systems (AFISs) which attempt the automatic identification of an individual based on the individual's fingerprint.

Previous systems have not achieved an adequate accuracy. Performance figures have been quoted in the pattern recognition literature for a number of fingerprint classification systems. In no case have the error rates been sufficiently low to justify using the technique in an AFIS.

Previous systems have assumed the use of rolled fingerprints to be necessary, whereas many automatic fingerprint identification systems are now designed to use dabs, where the fingerprint is only of the area of the finger in contact with a flat surface at an instant of time. In particular, live scan dabs are used. In a live scan dab, the print is captured by an electronic device incorporating optical, electronic or ultrasound sensors.

Rolled prints have a greater area, and therefore provide more information as to the fingerprint class. In particular, many previous fingerprint classification methods are rule-based, relying on the detection of the core and delta features of a fingerprint which may not necessarily be available in a dab fingerprint.

SUMMARY OF THE INVENTION

It is therefore an object of the present invention to provide an improved apparatus and method for assigning a fingerprint to one of a series of classes.

According to the invention, a computer with one or more central processing units (CPUs), one or more memories, and one or more input devices. An input device captures a fingerprint image. A line generator constructs one or more fiducial lines crossing the fingerprint image. Each fiducial line crosses one or more of the lines of the fingerprint image at one or more feature points, each feature point having one or more metrics. A two-dimensional hidden Markov model uses the metrics to determine a probability that the image belongs to one or more categories and places the image in the category with highest probability. The classification is repeatable, so that subsequent prints from the same finger will always be assigned to the same class.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
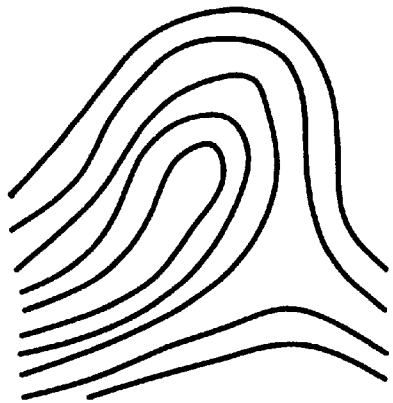
FIGS. 1A to 1E show examples of fingerprints illustrating some of the sample classes that might be used in the preferred system.
Figure 1B:
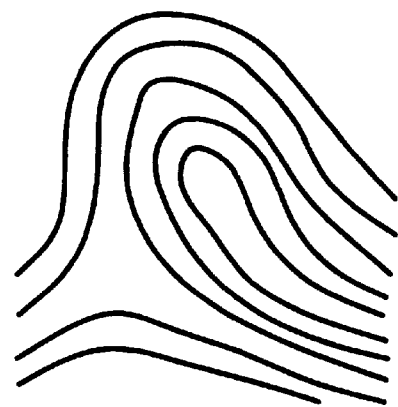
Figure 1C:
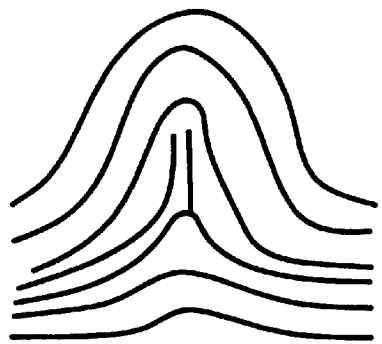
Figure 1D:
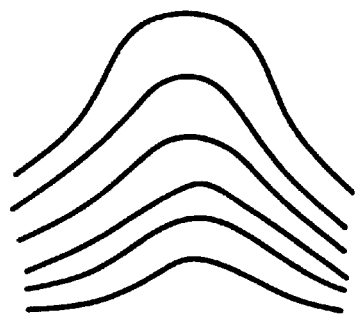
Figure 1E:
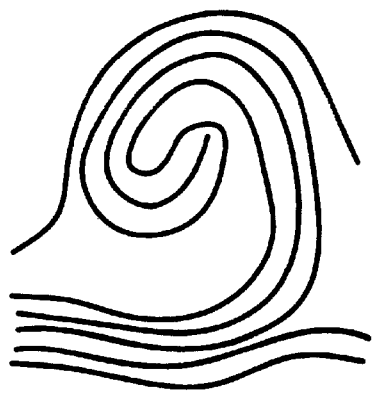
Figure 2:
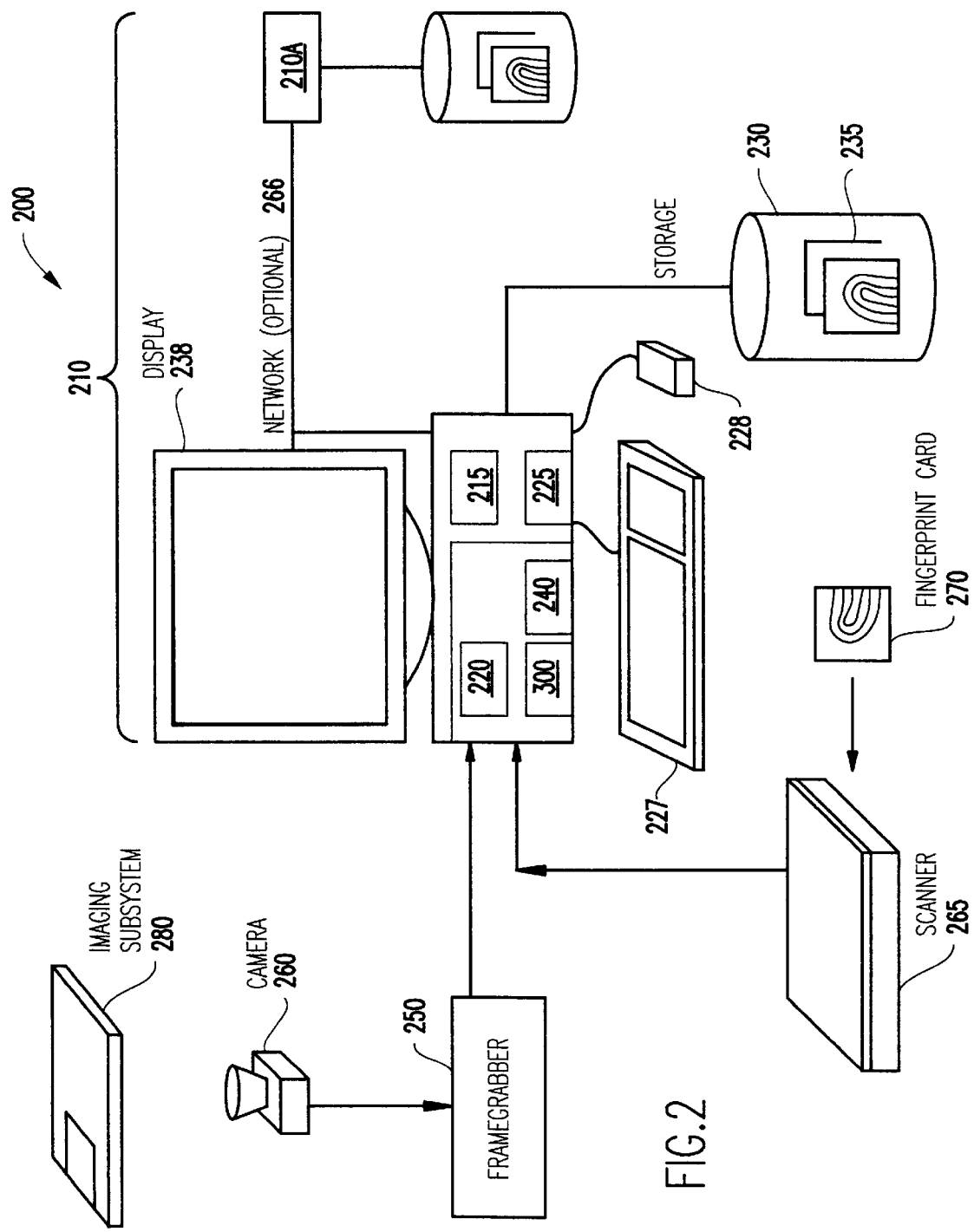
FIG. 2 is a block diagram of a hardware platform on which the preferred embodiment of the present system may be implemented.

Referring again to the drawings, and more particularly to FIG. 2, there is shown the block diagram representation of a general computer hardware environment that is used as the image processing system 200. This computer 210 may be one of International Business Machines Corporation (IBM) Personal System/2™ (PS/2™) family of Personal Computers, RISC System/6000™, or Power Parallel System™ (SP/X™), or equivalent. The system 200 includes one or more central processing units (CPUs) 215, which may conform to any general computer architecture (e.g., Intel™ or a reduced instruction set (RISC) microprocessor such as the IBM PowerPC™)

The CPU 215 is attached to a system bus (not shown) to which are attached a read/write and/or random access memory (RAM) 220 that can include one or more cache memories, a read only memory (ROM) 240, and an input/output (I/O) adapter 225. The RAM 220 provides temporary storage for one or more application program processes 300 containing code and/or data, while the ROM typically includes the basic input/output system (BIOS) code. A disk memory 230, e.g., Direct Access Storage Devices (DASDs), here represented by a hard disk drive 230, are also connected to the CPU by an appropriate adapter (not shown) connected to the system bus.

The hard disk drive 230 typically stores the computer's operating system (OS), such as IBM's OS/2 or AIX (IBM's version of UNIX) operating systems, and various application programs, data, and/or databases. These databases include intermediate results and fingerprint image data 235. Typically, the input/output adapter 225 has attached to it a keyboard 227, a mouse 228, and/or other user interface devices (not shown).

The system 200 also includes a display 238, here represented as a cathode ray tube (CRT) display but which may be a liquid crystal display (LCD) or other suitable display supporting a graphic user interface (GUI). The display 238 is connected to the system bus via a display adapter (not shown).

The computer 210 is also interfaced with a frame grabber 250 and an image acquisition device, e.g., a camera 260 along with imaging subsystem to capture a live scan fingerprint image onto the computer memory/disk. Alternatively, the computer may communicate with a document scanning device 265 that scans the fingerprint image from a document, such as an inked fingerprint card 270. Any other known means can be used to enter a fingerprint image to the memory 235, e.g., transmitting an image over a network 266 from other equivalent systems 210A.

The hardware which comprise the various components of the system 200 and equivalents of these components are well known to those skilled in the data processing and image processing arts.

Figure 3:
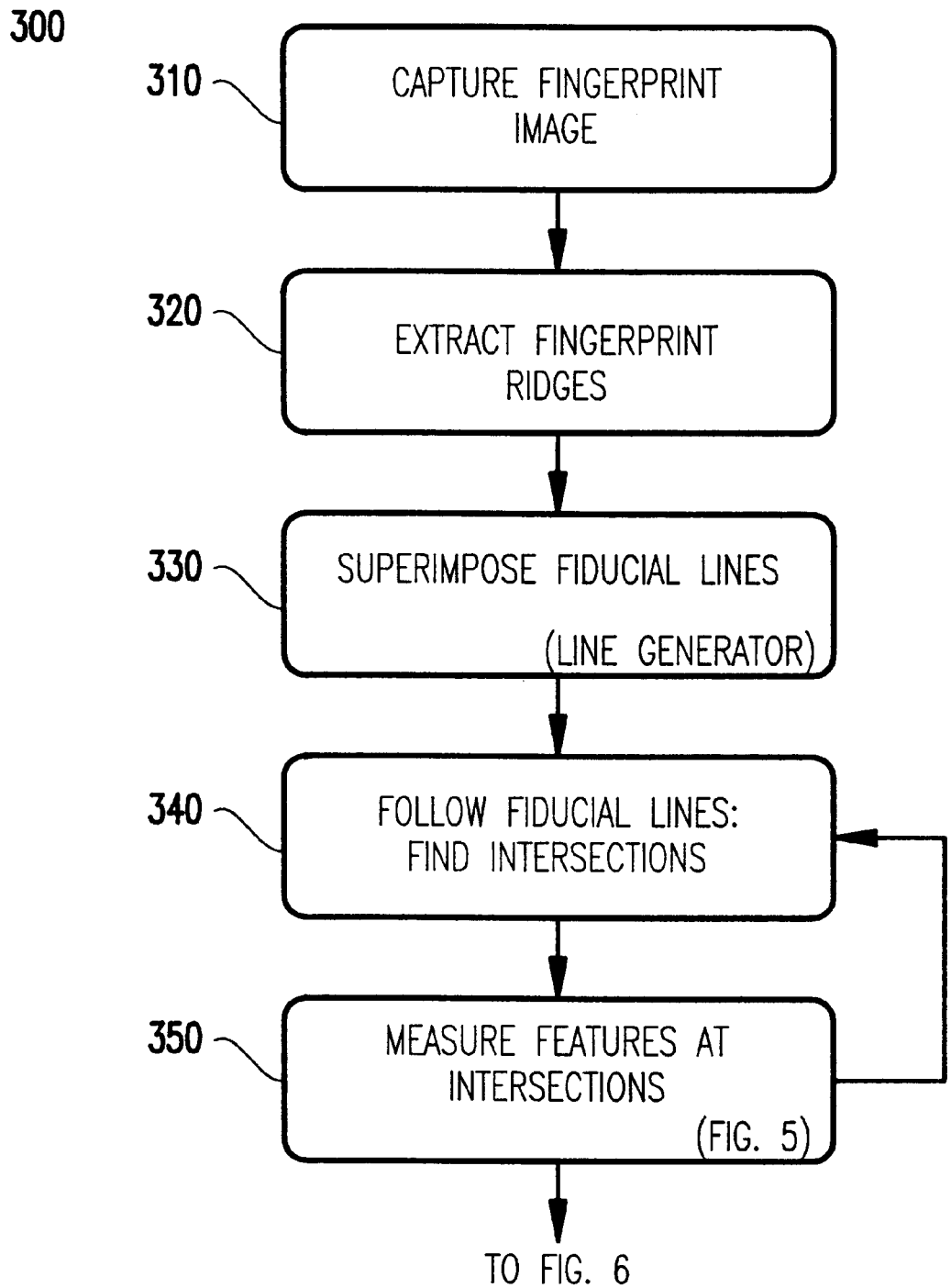
FIG. 3 is a representation of a fingerprint ridge image with fiducial lines superimposed on it.
Figure 4:
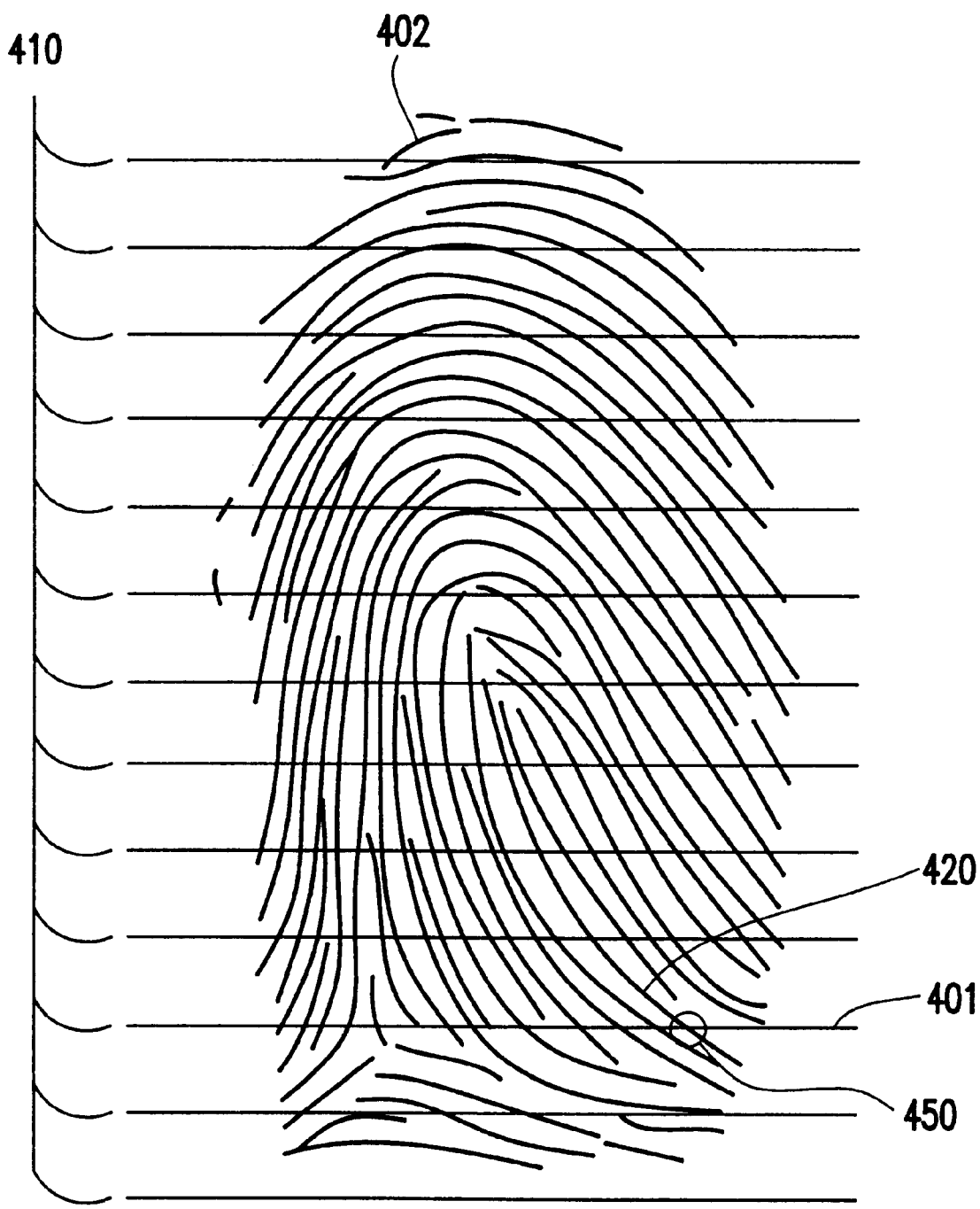
FIG. 4 is a flow chart showing the steps performed by the automatic fingerprint classification system according to the preferred embodiment of the invention.

FIG. 3 is a flow chart of the image processing system. The process begins by capturing a fingerprint image in step 310. This is done for example using the combination of the frame grabber 250, camera 260 and imaging subsystem 280 or the fingerprint card 270 and scanner 265 shown in FIG. 2. Once the image has been captured, the fingerprint ridges as shown in FIG. 4 are extracted in step 320. Steps 310 and 320 are known in the prior art. In particular the processes in step 320 are described by N. K. Ratha, K. Karu, S. Chen, and A. K. Jam in "A real-time matching system for large fingerprint databases", *IEEE Transactions on Pattern Analysis and Machine Intelligence* 18 (8): 799–813 (1996).

These processes involve algorithms to identify the locations in the image which correspond to ridges in the fingerprint. The step results in a new image whose pixels are in one of two states, indicating whether the pixel is part of a ridge or not. The ridges are one-pixel-wide chains of pixels. U.S. patent application Ser. No. 08/837,069 to Bolle et al., supra, gives a detailed description of the generation of ridge images.

Referring again to FIG. 3, step 330 involves the projection of fiducial lines on the fingerprint image, as generally shown in FIG. 4. The fiducial lines are parallel and may or may not be evenly spaced. The fiducial lines may be at any angle even though in the figures they are always shown horizontal.

FIG. 4 shows the projection of fiducial lines, 410, on the thinned fingerprint image, 402. An intersection 450 of a fiducial line 401 and an arch 420 is circled.

In step 340 of FIG. 3, each of the fiducial lines, is followed across the image to find all the intersections, such as 450 shown in FIG. 4, of the fiducial line with the fingerprint ridges. In step 350, at each intersection of a fiducial line, 401, with a ridge, 420, several measurements are made.

Figure 5:
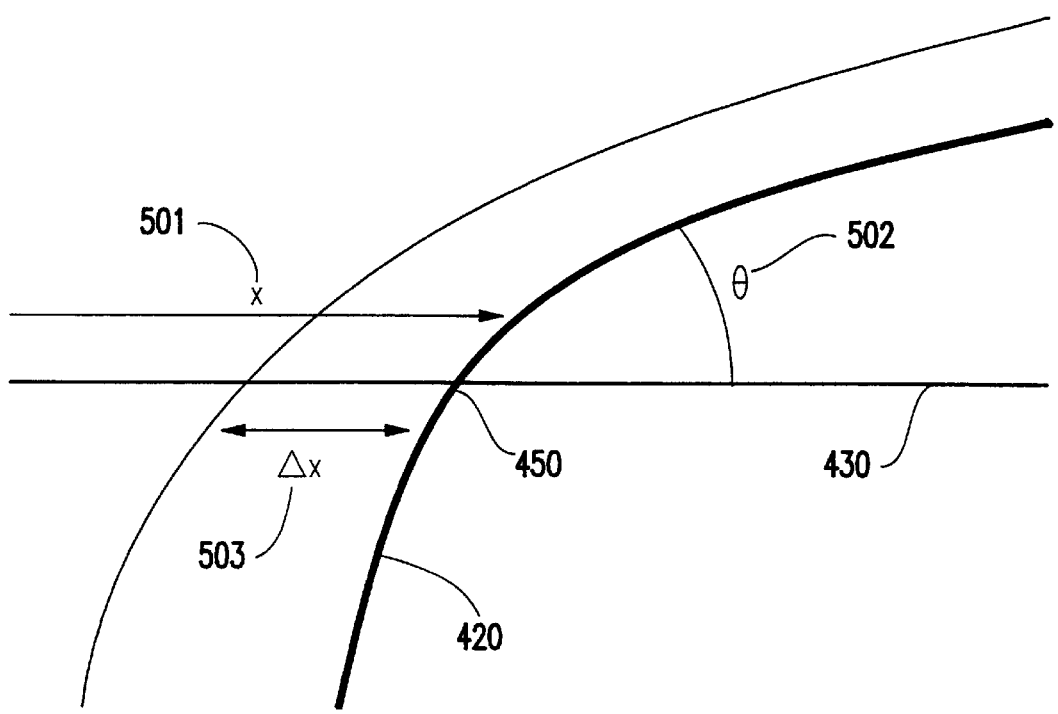
FIG. 5 is a diagram showing some of the metrics measured at each intersection of a fiducial line with a ridge.

FIG. 5 shows an enlarged view of the intersection 450 shown in FIG. 4 to show some of the measurements that can be made. Such measurements can be the angle of intersection, 502, of the ridge with the fiducial line; the absolute coordinates of the intersection, e.g., the X-coordinate, 501; and the relative X-coordinate, 503, of the intersection with respect to the last intersection found. Other features, not shown, can also be measured. These might include, for example, the change in the angle 502 between consecutive intersections or the curvature of the ridge at the intersection. Given the positions of the ON pixels in the image, calculation of the points of intersection and the corresponding measurements is a simple matter for a programmer skilled in the art.

The measurements from step 350 in FIG. 3 are encoded as vectors of numbers, one vector for each intersection. The features may be encoded in any units. Each fingerprint's measurements are represented as a set of rows of such vectors, each row corresponding to one fiducial line.

Figure 6:
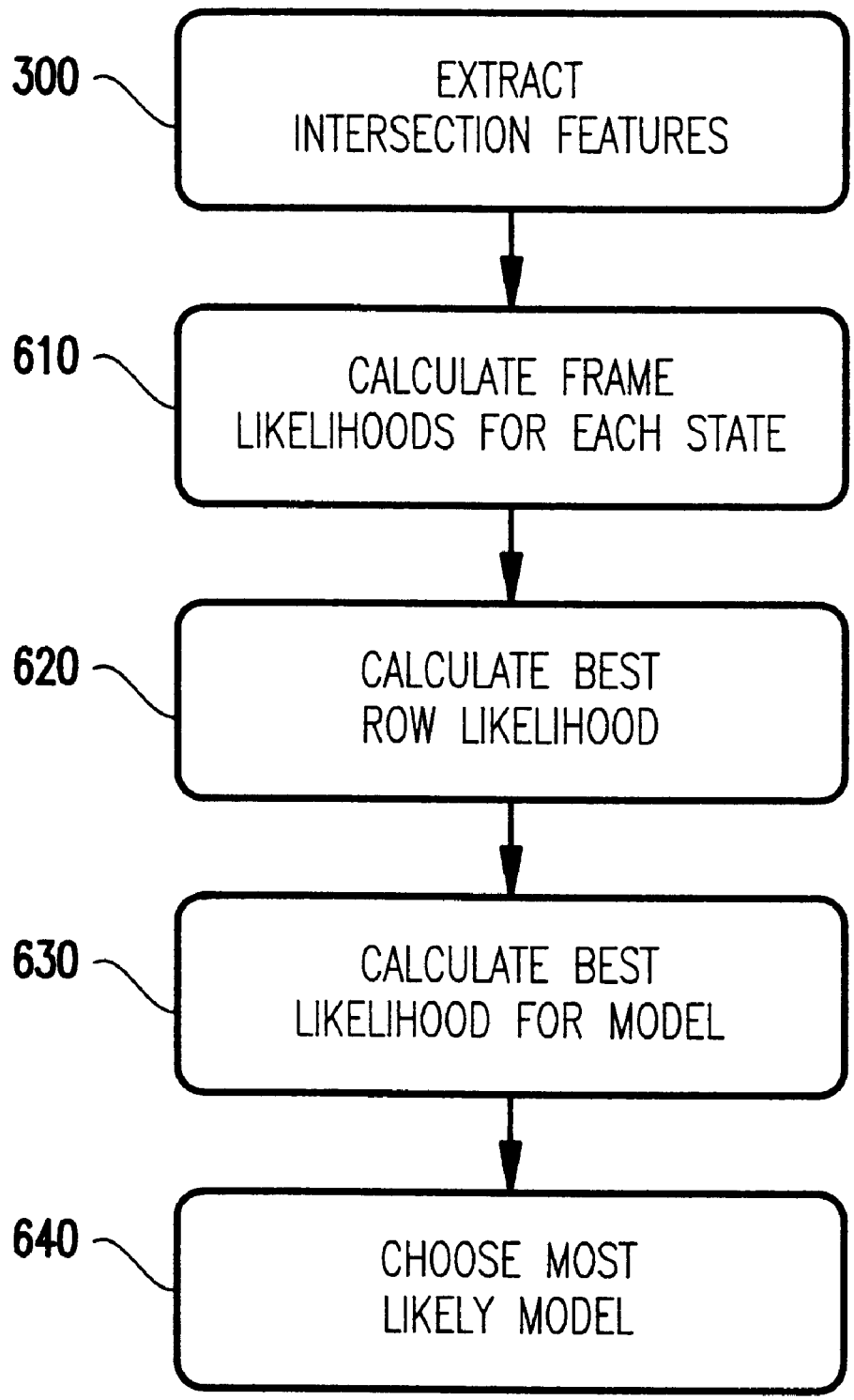
FIG. 6 is a flow chart showing the steps performed by the preferred automatic fingerprint classification system to distinguish between different classes of fingerprints.

To perform the actual classification, the steps of the flow chart shown in FIG. 6 are performed. These steps are the steps of a two-dimensional Hidden Markov Model (HMM). The method of hidden Markov models has been described previously, although the application of hidden Markov models to fingerprints is novel. See, for example, L. R. Rabiner and B. H. Juang, "An introduction to hidden Markov models", *IEEE ASSP Magazine* 3 (1): 4–16 (1986). The models are constructed from training data, using the well-known Viterbi and Expectation-Maximization algorithms from the prior art.

A hidden Markov model consists of a number of probability distributions which are organized into a is series of states. One model is constructed for each class in the system of classification. As described in more detail below, in this invention the states correspond to different areas of the fingerprint image. The probability distributions record the likelihoods of different feature vectors being observed in a particular area of a print of a given class. In the preferred embodiment, the distributions are represented as mixtures of Gaussians, well known to those skilled in the art.

Traditionally, hidden Markov models have been used for classifying one-dimensional processes, such as speech and handwriting. Their application to image processing has been limited because they are not well-suited to processing two-dimensional image data. Ferdinando Samaria and Frank Fallside adopted a scanning approach to convert an image to a one-dimensional stream of vectors, as reported in "Face Identification and Feature Extraction Using Hidden Markov Models", *Image Processing: Theory and Applications,* 1, edited by G. Vernazza, Elsevier (1993).

Oscar E. Agazzi, Shyh-shiaw Kuo, Esther Levin and Roberto Pieraccini have described a two-dimensional HMM structure used for optical character recognition, as reported in "Connected & Degraded Text Recognition Using Planar Hidden Markov Models", *Proceedings of the International*

*Conference on Acoustics, Speech and Signal Processing,* Volume V, pp. 113–116 (1993).

The preferred embodiment of this system uses a two-dimensional hidden Markov model, which is a hierarchy of two HMMs. The lower level models each model the data from rows of features in the direction of the fiducial lines. The upper level of the hierarchy combines the results of the lower level models, and can be considered to be working in the orthogonal direction. In this embodiment, both types of models are standard one-dimensional HMMs, but the combined effect is good modeling of images which are inherently organized as rows of data representing parallel strips of the image to be classified. The states of the upper-level model correspond exactly to whole lower-level models.

The process shown in FIG. 6 begins first by extracting intersection features. This is done by performing all the steps shown in FIG. 3. In step 610, the likelihoods for each frame of data are calculated for each of the states of each model. According to the preferred embodiment, this may be performed by calculating the probability for the frame given each of a number-of Gaussian distributions, and calculating a weighted sum of these probabilities using weights that are some of the trained parameters of the model. A number of well-known methods may also be applied to reduce the amount of calculation at this step since most frame-state combinations are unlikely and need not be calculated. Next, in step 620, for each row of each model, the probability of the row data given the states of the row, is determined using the technique of Dynamic Programming from the prior art. As a side effect of dynamic programming, the optimum alignment of frames to model states is found. An alignment takes an ordered list of frames and assigns each frame to one of an ordered list of states, preserving the order. The number of frames need not be the same as the number of states, and states need not receive the same number of frames.

Then, in step 630, this procedure is repeated for the whole model instead of one row, and with whole rows of data being aligned to states of the upper-level model (whereas frames were before aligned to states of the lower-level model). Given the intra-row alignments, the optimal inter-row alignment can be made with the upper-level model, whose states correspond to strips of the image parallel to the fiducial lines. The probability of a state of the upper-level model, given a row of data, is simply them probability of the optimal alignment of that row with the lower-level model associated with the upper-level state. The optimal alignment for each model has an associated probability which is the likelihood of the presented fingerprint data, given that model.

Finally, in step 640, these probabilities are compared, the highest is considered to be the likelihood of the data. The class label of the most likely model is the most likely class for the print and is the answer which is returned as the classification.

If the probabilities for the most likely models are similar, then the classification is less confident. Thus, the classification system would make fewer errors if allowed to return an ambiguous answer, returning a list of the likely classes rather than the single most likely class.

While the invention has been described in terms of a single preferred embodiment, those skilled in the art will recognize that the invention can be practiced with modification within the spirit and scope of the appended claims.

I claim:

1. A system for classifying images, comprising:

a computer with one or more central processing units, one or more memories, and one or more input devices;

an input device that captures one or more images of an object, said images having one or more image lines corresponding to the object;

a line generator function running on the computer that constructs a plurality of fiducial lines, said fiducial lines being a set of lines crossing the image, each said fiducial line crossing one or more of said image lines at one or more feature points, determining one or more metrics each said feature point, organizing said feature points as an ordered plurality of one-dimensional, ordered series of metrics, wherein each said ordered series of metrics corresponds to feature points along one fiducial line; and a two-dimensional hidden Markov model function running on the computer that uses said ordered plurality of one-dimensional ordered series of metrics to determine a probability that the image belongs to one or more categories and places the image in the category with highest probability, said two-dimensional hidden Markov model including a hierarchy of one-dimensional hidden Markov models operating in orthogonal directions.

2. A system, as in claim 1, wherein said one or more metrics include any one or more of:

a distance between two feature points;

an angle of intersection of the fiducial line with the image line;

a change in angle between two feature points;

a curvature of the image line at the intersection; and an absolute position of the feature.

3. A system, as in claim 1,. wherein said image is a fingerprint image and said image lines are ridges of said fingerprint.

4. A system, as in claim 1, wherein said image is a fingerprint image and said image lines are valleys of said fingerprint.

5. A system, as in claim 1, wherein a confidence score is derived from said probabilities to quantify the certainty of the classification.

6. A system, as in claim 5, wherein said confidence score is used to determine when said classification is uncertain and said pattern can only be determined to be in a set containing more than one category.

7. A system, as in claim 1, wherein said results of said classifier are combined with the results of another classifier to give an improved system.

\* \* \* \* \*